US012413963B2

(12) United States Patent
Li

(10) Patent No.: US 12,413,963 B2
(45) Date of Patent: Sep. 9, 2025

(54) COMMUNICATION METHOD AND APPARATUS

(71) Applicant: Huawei Technologies Co., Ltd., Shenzhen (CN)

(72) Inventor: Fei Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 139 days.

(21) Appl. No.: 18/505,391

(22) Filed: Nov. 9, 2023

(65) Prior Publication Data

US 2024/0089728 A1 Mar. 14, 2024

Related U.S. Application Data

(63) Continuation of application No. PCT/CN2022/089936, filed on Apr. 28, 2022.

(30) Foreign Application Priority Data

May 10, 2021 (CN) .......................... 202110504785.6

(51) Int. Cl.
*H04L 29/06* (2006.01)
*H04W 12/033* (2021.01)
(Continued)

(52) U.S. Cl.
CPC ....... *H04W 12/033* (2021.01); *H04W 12/041* (2021.01); *H04W 12/06* (2013.01); *H04W 12/10* (2013.01)

(58) Field of Classification Search
None
See application file for complete search history.

(56) References Cited

U.S. PATENT DOCUMENTS 10,778,697 B2 * 9/2020 Cho .................. H04W 76/20
11,071,050 B2 * 7/2021 Wang ................ H04W 12/02
(Continued)

FOREIGN PATENT DOCUMENTS

WO 2020145064 A1 7/2020

OTHER PUBLICATIONS

Ma, Yuchi; Li, Yifa. Research on Formal Design of Key Exchange Protocol in Trusted Computing. 2008 IEEE International Symposium on Knowledge Acquisition and Modeling Workshop. https://ieeexplore.ieee.org/stamp/stamp.jsp?tp=&arnumber=4810568 (Year: 2008).*

(Continued)

*Primary Examiner* — Jeremiah L Avery
(74) *Attorney, Agent, or Firm* — Slater Matsil, LLP

(57) ABSTRACT

A communication method and apparatus are provided. The method includes: A home network security endpoint receives a first request from user equipment, where the first request includes a first identifier of the user equipment. The home network security endpoint then send a second request to a first network function, where the second request includes a second identifier of the user equipment, and receive a first key from the first network function, where the first key is generated based on a cipher key, an integrity key, and a name of a serving network of the user equipment. The home network security endpoint may generate a second key based on the first key, where the second key includes an encryption protection key and/or an integrity protection key.

19 Claims, 9 Drawing Sheets

(51) Int. Cl.
  *H04W 12/041* (2021.01)
  *H04W 12/06* (2021.01)
  *H04W 12/10* (2021.01)

(56) References Cited

U.S. PATENT DOCUMENTS

| | | | | |
|---|---|---|---|---|
| 11,122,427 | B2* | 9/2021 | Ohlsson | H04L 9/0866 |
| 11,419,153 | B2* | 8/2022 | Choe | H04W 72/04 |
| 2019/0320316 | A1* | 10/2019 | Mildh | H04L 9/0891 |
| 2020/0175194 | A1* | 6/2020 | Marathe | H04L 9/0866 |
| 2020/0294026 | A1* | 9/2020 | Nahari | G06Q 30/0613 |
| 2021/0092604 | A1* | 3/2021 | Fox | H04L 9/0891 |
| 2021/0112408 | A1* | 4/2021 | Pazhyannur | H04W 12/041 |
| 2021/0319894 | A1* | 10/2021 | Sobol | G16H 20/30 |

OTHER PUBLICATIONS

Chen, Lu et al. A New Information Measurement Scheme Based on TPM for Trusted Network Access. 2007 International Conference on Computational Intelligence and Security Workshops (CISW 2007). https://ieeexplore.ieee.org/stamp/stamp.jsp?tp=&arnumber=4425544 (Year: 2007).*

Brusilovsky, Alec; McDonald, Ira. 5G and the Need for Platform Integrity. Journal of ICT Standardization, vol. 8, issue: 1. https://ieeexplore.ieee.org/stamp/stamp.jsp?tp=&arnumber=10258064 (Year: 2020).*

KPN: "pCR to Living document for TS 33.163: update for 3G, 4G, and 5G key agreement", 3GPP Draft; S3-211461, 3RD Generation Partnership Project (3GPP), Mobile Competence Centre; 650, Route Des Lucioles; F-06921 Sophia-Antipolis Cedex; France vol. SA WG3, No. e-meeting; May 17, 2021-May 28, 2021 May 7, 2021 (May 7, 2021), XP052003227, total 9 pages.

Deutsche Telekom AG: "Discussion paper BEST key hierarchy based on AKMA", 3GPP Draft; S3-211429, 3rd Generation Partnership Project (3GPP), Mobile Competence Centre; 650, Route Des Lucioles; F-06921 Sophia-Antipolis Cedex; France vol. SA WG3, No. e-meeting; May 17, 2021-May 28, 2021 May 7, 2021 (May 7, 2021), XP052003222, total 3 pages.

* cited by examiner

COMMUNICATION METHOD AND APPARATUS

CROSS-REFERENCE TO RELATED APPLICATIONS

This application is a continuation of International Application No. PCT/CN2022/089936, filed on Apr. 28, 2022, which claims priority to Chinese Patent Application No. 202110504785.6, filed on May 10, 2021. The disclosures of the aforementioned applications are hereby incorporated by reference in their entireties.

TECHNICAL FIELD

This application relates to the field of communication technologies, and in particular, to a communication method and apparatus.

BACKGROUND

In the field of wireless communication, for a low-throughput machine type communication device, a battery efficient security solution is defined in a 4G technology, and is referred to as battery efficient security for very low throughput machine type communication devices (BEST). A main objective of the BEST is to derive, by using a home public land mobile network (HPLMN) security endpoint (HSE) and user equipment (UE) in a 4G network architecture and based on a cipher key (CK) and an integrity key (IK) of the UE respectively, a security key used to protect UE data, to protect data security of the UE.

However, in a 5G architecture, the HSE cannot obtain the CK and the IK of the UE, and cannot derive the security key based on the CK and the IK. As a result, a BEST authentication manner in the 4G technology is not fully applicable to the 5G architecture, and consequently, a data security risk of the UE increases.

SUMMARY

An objective of implementations of this application is to provide a communication method and apparatus, to provide a security key obtaining manner applicable to a network architecture such as 5G, to reduce a data security risk of user equipment in the network architecture such as 5G.

According to a first aspect, an embodiment of this application provides a communication method. The method may be performed by a home network security endpoint, and includes: The home network security endpoint receives a first request from user equipment, where the first request includes a first identifier of the user equipment. The home network security endpoint may further send a second request to a first network function. The second request includes a second identifier of the user equipment, and the second identifier is determined based on the first identifier, or the second identifier is the same as the first identifier. The home network security endpoint receives a first key from the first network function. The first key is generated based on a cipher key, an integrity key, and first information. The home network security endpoint may generate a second key based on the first key. The second key includes an encryption protection key and/or an integrity protection key between the user equipment and the home network security endpoint. The first information includes at least one of a name of a serving network of the user equipment, an identifier of the home network security endpoint, a SUPI of the user equipment, and an identifier of a BEST service.

According to the foregoing method, the home network security endpoint may obtain the first key, where the first key is generated based on the cipher key, the integrity key, and the first information. Therefore, the home network security endpoint can obtain the first key without obtaining the cipher key and the integrity key of the UE, and may subsequently generate, based on the first key, a security key used to protect user equipment data. Therefore, this solution can provide a security key obtaining manner applicable to 5G and another network architecture, and can reduce a data security risk of the user equipment.

In a possible design, the first identifier of the user equipment includes a SUCI of the user equipment, and the second identifier of the user equipment includes the SUPI of the user equipment. Before that the home network security endpoint sends a second request to a first network function, the method may further include: The home network security endpoint obtains the SUPI of the user equipment based on the SUCI. Alternatively, the home network security endpoint decrypts the SUCI based on a private key of the home network security endpoint, to obtain the SUPI. The SUCI is obtained by encrypting the SUPI based on a public key of the home network security endpoint.

In a possible design, the first identifier of the user equipment includes an identifier allocated by the home network security endpoint to the user equipment, and the second identifier of the user equipment includes the SUPI of the user equipment. Before that the home network security endpoint sends a second request to a first network function, the method may further include: The home network security endpoint obtains the SUPI of the user equipment based on the identifier allocated by the home network security node to the user equipment.

In a possible design, that the home network security endpoint obtains the SUPI of the user equipment based on the SUCI may include: The home network security endpoint sends the SUCI of the user equipment to the first network function; and receives the SUPI from the first network function.

In a possible design, if the second identifier is the same as the first identifier, the first identifier includes the SUCI and/or the SUPI of the user equipment.

According to the foregoing method, the user equipment and the home network security endpoint communicate with each other based on the SUCI or the SUPI of the user equipment, or the identifier allocated by the home network security endpoint to the UE, and may communicate with each other without using an IMSI, so that the method is applicable to a communication manner in a network architecture such as 5G. In addition, authentication and key derivation are performed by using the SUCI, so that security can be further improved.

In a possible design, the second request is a request of obtaining user equipment authentication. The request of obtaining user equipment authentication further includes indication information, and the indication information indicates to generate the first key based on the cipher key, the integrity key, and the first information.

In a possible design, the first request further includes the name of the serving network of the user equipment, and the second request further includes the name of the serving network.

In a possible design, the first network function includes an authentication server function or a unified data management function.

In a possible design, the home network security endpoint may send a random number and/or an authentication token to the user equipment.

In a possible design, that the home network security endpoint generates a second key based on the first key includes: The home network security endpoint generates the second key based on the first key and second information. The second information includes at least one of the following: the identifier of the home network security endpoint, an algorithm type identifier of the BEST service of the user equipment, a sequence number that is in the user equipment and that is for computing an authentication token, an anonymity key, the SUPI of the user equipment, the random number, or an authentication token. The second information may be from the first network function.

In a possible design, the first request further includes an encryption indication, and the method may further include: The home network security endpoint starts an encryption service. If the encryption service is started, the second key includes the encryption protection key.

In a possible design, before the home network security endpoint generates a second key based on the first key, the method may further include: The home network security endpoint receives the encryption indication from the first network function; and determines, based on the encryption indication, whether to start a user-plane encryption service of the user equipment.

According to a second aspect, a communication method is provided. The communication method may be performed by a unified data management function, and includes: The unified data management function receives a second request from a home network security endpoint. The second request includes a second identifier of user equipment. The unified data management function may generate a cipher key and an integrity key of the user equipment based on the second identifier, and generate a first key based on the cipher key, the integrity key, and first information. The unified data management function may send the first key to the home network security endpoint. The first information includes at least one of a name of a serving network of the user equipment, an identifier of the home network security endpoint, a SUPI of the user equipment, and an identifier of a BEST service.

In a possible design, the method may further include: The unified data management function receives an SUCI of the user equipment from the home network security endpoint; determines the SUPI of the user equipment based on the SUCI; and sends the SUPI of the user equipment to the home network security endpoint.

In a possible design, the second identifier may include the SUCI or the SUPI of the user equipment.

In a possible design, the method may further include: The unified data management function sends an encryption indication to the home network security endpoint.

In a possible design, the second request is a request of obtaining user equipment authentication. The request of obtaining user equipment authentication further includes indication information. That the unified data management function generates a first key based on the cipher key, the integrity key, and first information may include: The unified data management function generates the first key based on the cipher key, the integrity key, and the first information after receiving the indication information.

In a possible design, the second request may further include the name of the serving network of the user equipment.

Alternatively, the method may further include: The unified data management function determines, based on the second identifier, a name of a serving network with which the user equipment is registered, or a name of a serving network which is authenticated by the user equipment, or a name of a serving network in which the user equipment is located.

In a possible design, the unified data management function may send second information to the home network security endpoint. The second information includes at least one of the following: the identifier of the home network security endpoint, an algorithm type identifier of the BEST service of the user equipment, a sequence number that is in the user equipment and that is for computing an authentication token, an anonymity key, the SUPI of the user equipment, a random number, or an authentication token.

According to a third aspect, a communication method is provided. The communication method may be performed by user equipment, and includes: The user equipment sends a first request to a home network security endpoint. The first request includes an identifier of the user equipment. The user equipment may further receive a random number sent by the home network security endpoint. The user equipment may generate a cipher key and an integrity key based on the random number and a root key of the user equipment. The user equipment generates a first key based on the cipher key, the integrity key, and first information, and generates a second key based on the first key. The second key includes an encryption protection key and/or an integrity protection key between the user equipment and the home network security endpoint. The first information includes at least one of a name of a serving network of the user equipment, an identifier of the home network security endpoint, a SUPI of the user equipment, and an identifier of a BEST service.

In a possible design, that the user equipment generates a second key based on the first key may include: generating the second key based on the first key and third information. The third information includes at least one of the following: the identifier of the home network security endpoint, an algorithm type identifier of the BEST service of the user equipment, a sequence number that is in the user equipment and that is for computing an authentication token, an anonymity key, the SUPI of the user equipment, the random number, or the authentication token.

In a possible design, the first request further includes the name of the serving network of the user equipment; and/or the first request further includes an encryption indication. The encryption indication indicates that the user equipment requests a user-plane encryption service.

In a possible design, the identifier of the user equipment includes an SUCI or the SUPI of the user equipment, or an identifier allocated by the home network security endpoint to the user equipment.

According to a fourth aspect, an embodiment of this application provides a communication apparatus. The communication apparatus includes a processor, and the processor is coupled to a memory. The memory is configured to store instructions, and the processor is configured to execute the instructions stored in the memory, to perform the method in any one of the first aspect to the third aspect or the possible designs of the foregoing aspects. Optionally, the communication apparatus may further include the memory. Optionally, the communication apparatus may further include a transceiver, configured to support the communication apparatus in sending and/or receiving information in the foregoing method. Optionally, the communication apparatus may be a terminal device, or may be an apparatus in the terminal device, for example, a chip or a chip system. The chip system includes at least one chip, and the chip system may further include another circuit structure and/or a discrete device.

According to a fifth aspect, an embodiment of this application provides a communication apparatus, configured to implement the method in any one of the first aspect to the third aspect or the possible designs of the foregoing aspects, and including corresponding function modules, for example, including a processing unit and a communication unit, which are respectively configured to implement steps in the foregoing method.

According to a sixth aspect, an embodiment of this application provides a computer-readable storage medium, where the computer-readable storage medium stores computer-readable instructions. When a computer reads and executes the computer-readable instructions, a communication apparatus is enabled to perform the method in any one of the first aspect to the third aspect or the possible designs of the foregoing aspects.

According to a seventh aspect, an embodiment of this application provides a computer program product. When a computer reads and executes the computer program product, a communication apparatus is enabled to perform the method in any one of the first aspect to the third aspect or the possible designs of the foregoing aspects.

According to an eighth aspect, an embodiment of this application provides a chip, where the chip is connected to a memory, and is configured to read and execute a software program stored in the memory, to perform the method in any one of the first aspect to the third aspect or the possible designs of the foregoing aspects.

According to a ninth aspect, an embodiment of this application provides a communication apparatus, including a processor. The processor is configured to be coupled to a transceiver, and read and execute instructions in the memory, to perform the method in any one of the first aspect to the third aspect or the possible designs of the foregoing aspects.

According to a tenth aspect, an embodiment of this application provides a communication system, including an apparatus configured to perform the method in any one of the first aspect or the possible designs of the first aspect, an apparatus configured to perform the method in any one of the second aspect or the possible designs of the second aspect, and an apparatus configured to perform the method in any one of the third aspect or the possible designs of the third aspect.

For beneficial effects of the second aspect to the tenth aspect, refer to descriptions of beneficial effects in the first aspect.

DETAILED DESCRIPTION OF ILLUSTRATIVE EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment.

The following explains terms related in this application.

At least one means one or more, to be specific, includes one, two, three, or more.

"A plurality of" means two or more, to be specific, includes two, three, or more.

Carrying may mean that a message is used to carry information or data, or may mean that the message includes the information.

Coupling means indirect coupling or a communication connection between apparatuses, units, or modules, may be in an electrical form, a mechanical form, or in another form, and is used for information exchange between the apparatuses, the units, or the modules.

In embodiments of this application, the term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. "At least one of the following" or similar expressions refer to any combination of these items, including any combination of single items or a plurality of items. For example, at least one of a, b, or c may indicate a, b, c, a and b, a and c, b and c, or a, b, and c, where a, b, and c may be singular or plural.

The following describes embodiments of this application in detail with reference to the accompanying drawings. First, a wireless communication system provided in embodiments of this application is described. A communication method provided in this application may be applied to the system. Then, the communication method provided in embodiments of this application is described. Finally, a communication apparatus provided in embodiments of this application is described.

Figure 1:
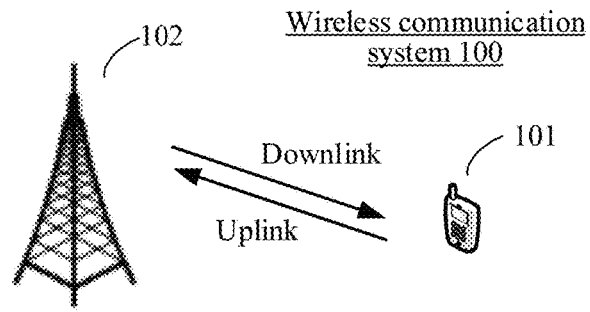
FIG. 1 is a schematic diagram of an architecture of a communication system according to an embodiment of this application.

As shown in FIG. 1, a wireless communication system 100 provided in an embodiment of this application may include a terminal device 101 and a network device 102.

It should be understood that the wireless communication system 100 provided in this embodiment of this application is applicable to both a low-frequency scenario (sub 6G) and a high-frequency scenario (above 6G). An application scenario of the wireless communication system 100 provided in this embodiment of this application includes but is not limited to a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a fifth generation system, or a new radio (NR) communication system.

The terminal device 101 shown above may be a device such as user equipment, a terminal, a mobile station (MS), or a mobile terminal. The terminal device 101 can communicate with one or more network devices of one or more communication systems, and accepts a network service provided by a network device. The network device herein includes but is not limited to the network device 102 shown in the figure. For example, in this embodiment of this application, the terminal device 101 may be a mobile phone (which is alternatively referred to as a "cellular" phone) or a computer having a mobile terminal. Alternatively, the terminal device 101 may be a portable, pocket-sized, handheld, computer built-in, or vehicle-mounted mobile apparatus. Alternatively, the terminal device 101 may be a communication chip having a communication module.

The network device 102 shown above may include an access network device (which is alternatively referred to as an access network station) described in this application. Specifically, the network device 102 may include the access network device. In this application, the access network device refers to a device that provides a network access function, for example, a radio access network (RAN) base station. The network device 102 may specifically include a base station (BS), or include a base station, a radio resource management device configured to control the base station, and the like. The network device 102 may be a relay station, an access point, a vehicle-mounted device, a wearable device, a base station in a network such as future 5G, a base station in a future evolved public land mobile network (PLMN), an NR base station, or the like. This is not limited in this embodiment of this application. Alternatively, the network device 102 may be a communication chip having a communication module.

In a process of performing the method in this application, the network device 102 may serve as the RAN base station to provide a wireless network connection for the terminal device 101. For example, the network device 102 may serve as an access network base station in a 4G access network, namely, an evolved universal mobile telecommunications system (UMTS) terrestrial radio access network (E-UTRAN). Alternatively, the network device 102 may serve as an access network base station in a 5G access network, namely, a 5G RAN. Alternatively, the network device 102 may serve as an access network base station in a future wireless communication system.

Figure 2:
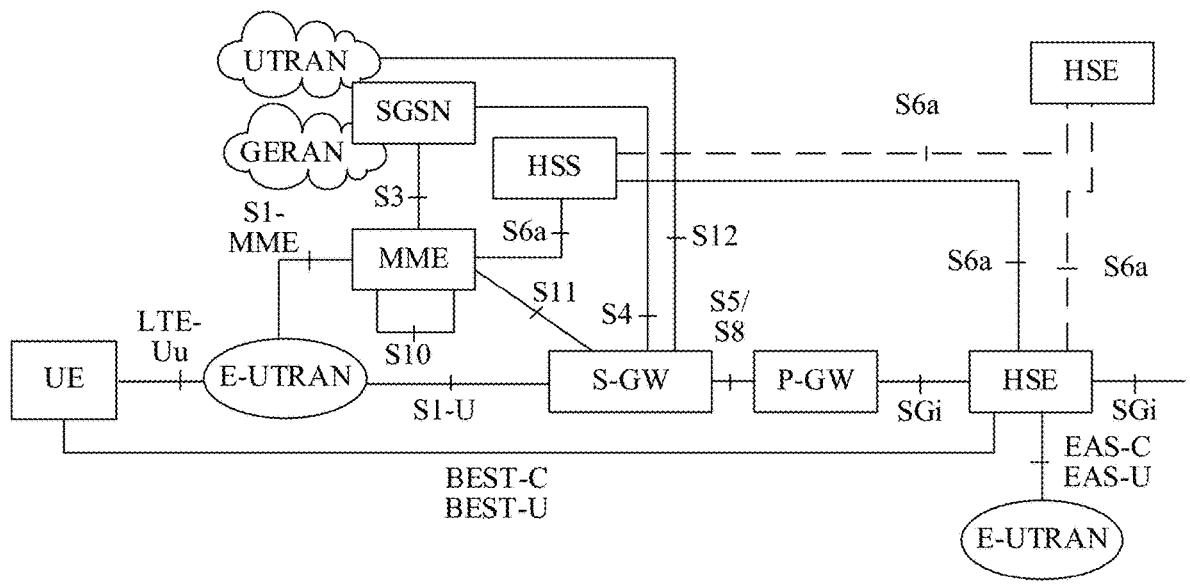
FIG. 2 is a schematic diagram of a network architecture of a 4G BEST solution.
Figure 3:
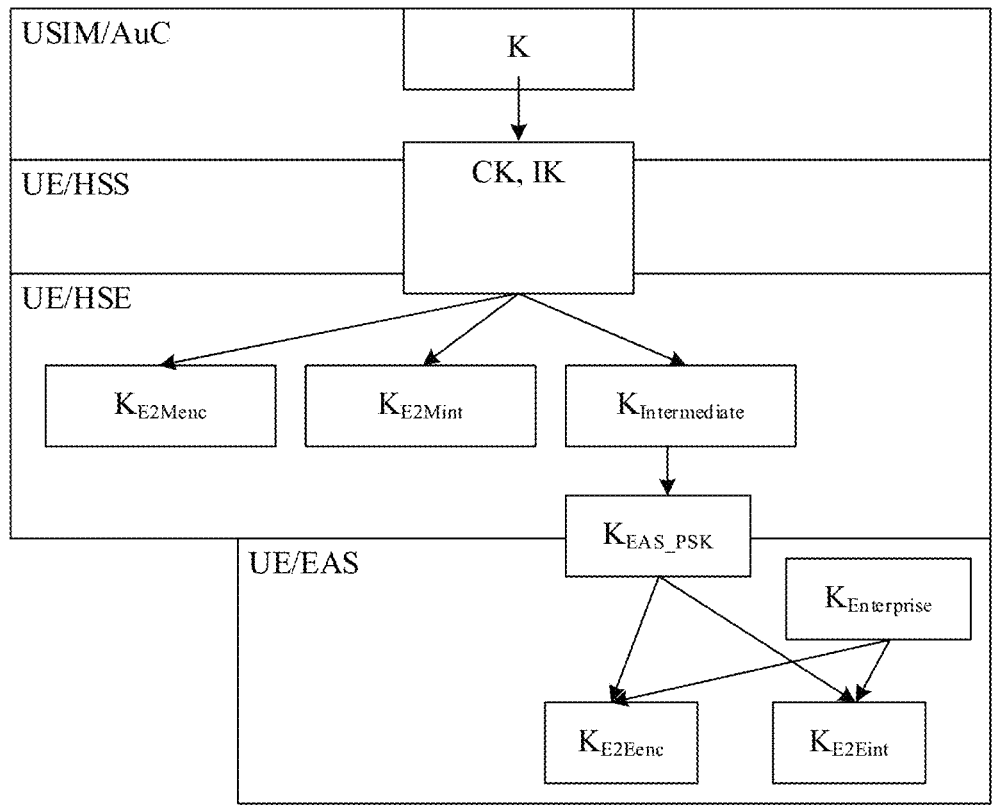
FIG. 3 is a schematic diagram of a key architecture in a 4G BEST solution.

Currently, a solution of battery efficient security for very low throughput machine type communication devices, which is referred to as BEST, is defined in 4G. FIG. 2 shows a network architecture of the solution. A main objective is to complete authentication of UE and key generation by using an HSE, to derive a security key used to protect UE data. An entire architecture of the key is shown in FIG. 3.

In a 4G network architecture, there are two possibilities for interaction between the HSE and a home subscriber server (HSS). One is that the HSE interacts with the HSS directly through an interface, and the other is that the HSE interacts with the HSS via an end to middle key server (EMKS). For ease of expression, subsequent procedures in this application are all based on the first manner. However, in an actual application, the HSE may interact with the HSS via the EMKS.

Figure 4:
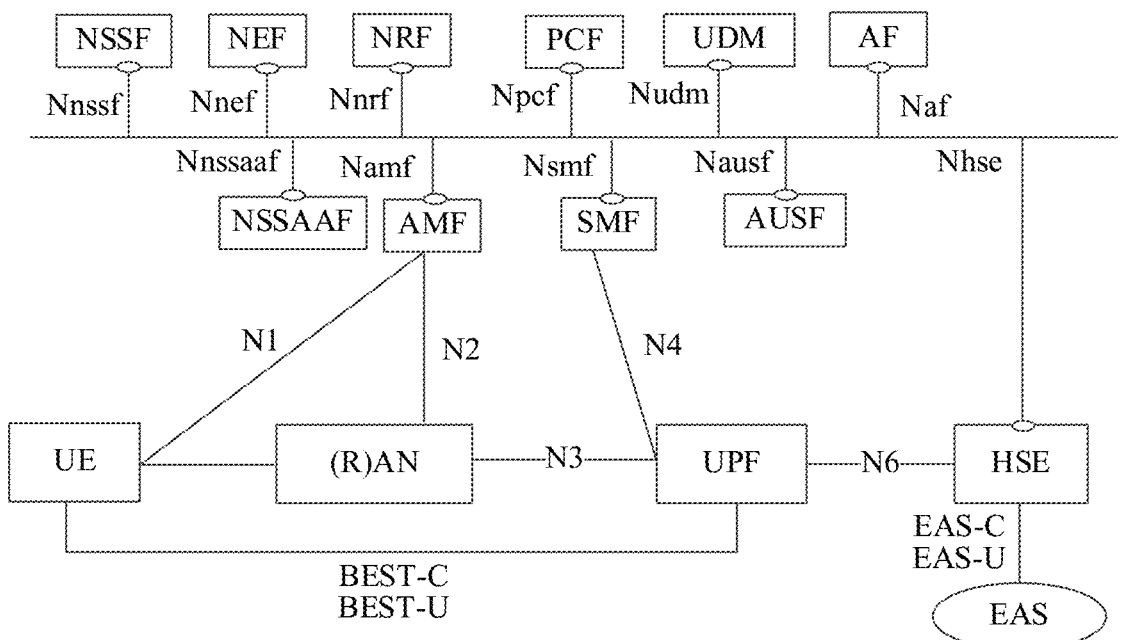
FIG. 4 is a schematic diagram of an architecture of a communication system according to an embodiment of this application.

Based on the architecture in FIG. 4, the UE and the HSE generate different keys based on different data protection manners from the UE to an enterprise application server (EAS).

In a protection manner, the UE and the EAS perform end to end (E2E) protection. In this case, the HSE needs to generate an intermediate key and an EAS specific pre-shared key for the EAS, that is, $K_{intermediate}$ and $K_{EAS\_PSK}$ in FIG. 3. Then, the EAS and the UE generate an E2E security key based on $K_{EAS\_PSK}$, that is, $K_{E2Eenc}$ and $K_{E2Eint}$ in FIG. 3, which are respectively an encryption protection key and an integrity protection key.

In another protection manner, the UE, the HSE, and the EAS perform hop-by-hop protection. In this case, the HSE needs to generate only a security key between the HSE and the UE, that is, $K_{E2Menc}$ and $K_{E2Mint}$ in FIG. 3.

In the key generation process in the foregoing manner, the UE may carry an IMSI to request the HSE to establish a session, and the HSE determines whether UE needs to generate a key, in other words, the HSE determines whether there is a valid key that is with a valid counter value and that is for the UE. A determining manner is specifically as follows:

Case (1): If the HSE has a valid set of keys for an indicated session and a UE ID is valid for the session, the HSE may start a BEST session without re-negotiating a key.

Case (2): If a UE ID is valid for the HSE, but the HSE does not have a valid set of keys for an indicated session, or the HSE expects to update a key, the HSE needs to first renegotiate the key with the UE and then initiate a BEST session.

Case (3): If a UE ID is invalid for a session ID, the UE does not support a service level required by the HSE, or enterprise information is invalid for the HSE, the HSE may reject this command.

For ease of expression, in this application, the foregoing process of determining whether there is the valid key that is with the valid counter value and that is for the UE is subsequently referred to as determining, by the HSE, whether the UE has a valid key. In addition, the foregoing case (2) is referred to as determining, by the HSE, that the UE does not have a valid key. If the UE does not have a valid key, the HSE obtains an authentication vector from the HSS. The authentication vector includes a random number (RAND), an authentication token (AUTN), a CK, and an IK. The HSE calculates an HSE key based on the authentication vector. The HSE sends the RAND and the AUTN to the UE for authentication. After the UE successfully verifies the AUTN, the UE may return validation data (RES) to the HSE for verification, or may not return the verification data. After the authentication succeeds, the UE and HSE may derive other keys based on the CK and the IK, including but not limited to $K_{E2Eenc}$, $K_{E2Eint}$, $K_{E2Menc}$, and $K_{E2Mint}$.

Currently, when a BEST service is applied to a 5G network architecture, there is an incompatibility problem. The following provides descriptions with reference to the 5G network architecture.

As shown in FIG. 4, the 5G network architecture may include three parts: the UE, a data network (DN), and a carrier network.

The carrier network may include network functions (NFs) such as a network slice selection function (NSSF), a network exposure function (NEF), a network repository function (NRF), a policy control function (PCF), a unified data management (UDM), an application function (AF), a network slice specific authentication and authorization function (NSSAAF), an authentication server function (AUSF), an access and mobility management function (AMF), a session management function (SMF), a (radio) access network ((R) AN), the HSE, the EAS, and a user plane function (UPF). In the foregoing carrier network, a part other than a (radio) access network may be referred to as a core network (CN) part. For ease of description, an example in which the (R)AN is referred to as a RAN is used below for description.

In this application, user equipment may include the UE shown in FIG. 4. The UE may be a device having a wireless transceiver function. The UE may be deployed on land, for example, in an indoor, outdoor, or vehicle-mounted manner, may be deployed on water (for example, on a ship), and may also be deployed in the air (for example, on an airplane, a balloon, or a satellite). The UE may be a mobile phone, a tablet computer (pad), a computer having a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. Alternatively, the UE may be the terminal device 101 shown in FIG. 1.

The UE may establish a connection to the carrier network by using an interface (for example, $N_1$) provided by the carrier network, and use services such as data and/or voice provided by the carrier network. The UE may further access the DN through the carrier network, and use a carrier service deployed on the DN and/or a service provided by a third party. The third party may be a service party other than the carrier network and the UE, and may provide services such as data and/or voice for the UE. A specific representation form of the third party may be specifically determined based on an actual application scenario, and is not limited herein.

In addition, a home network security endpoint in this application may include the HSE shown in FIG. 4. In future communication such as 6G, the home network security endpoint may still be the HSE or have another name. This is not limited in this application. An authentication server function may include the AUSF shown in FIG. 4. In future communication such as the 6G, the authentication server function may still be the AUSF or have another name. This is not limited in this application. A unified data management function may include the UDM shown in FIG. 4. In future communication such as the 6G, the unified data management function may still be the UDM or have another name. This is not limited in this application.

In FIG. 4, Nnssf, Nnef, Nausf, Nnrf, Npcf, Nudm, Naf, Namf, Nssaaf, Nsmf, Nhse, N1, N2, N3, N4, N6, BEST-C, BEST-U, EAS-C, and EAS-U are separately interface sequence numbers. For meanings and usages of these interface sequence numbers, refer to meanings defined in the 3GPP standard protocol. This is not limited herein.

In the 5G network architecture shown in FIG. 4, authentication and protection may still be performed on UE data by using the HSE. However, in the 5G network architecture, the HSE cannot obtain the CK and the IK. As a result, the HSE cannot generate a key based on the CK and the IK in a manner of key generation in the 4G network architecture. Consequently, incompatibility occurs when the BEST service in the 4G network architecture is applied to the 5G network architecture.

To resolve this technical problem, so that the BEST service can be implemented in 5G, an embodiment of this application provides a communication method. The method may be implemented by the user equipment, the home network security endpoint, and a first network function. The first network function may be the authentication server function and/or the unified data management function. For ease of description, an example in which the user equipment is the UE, the home network security endpoint is the HSE, the authentication server function is the AUSF, and the unified data management function is the UDM is used below for description.

Figure 5:
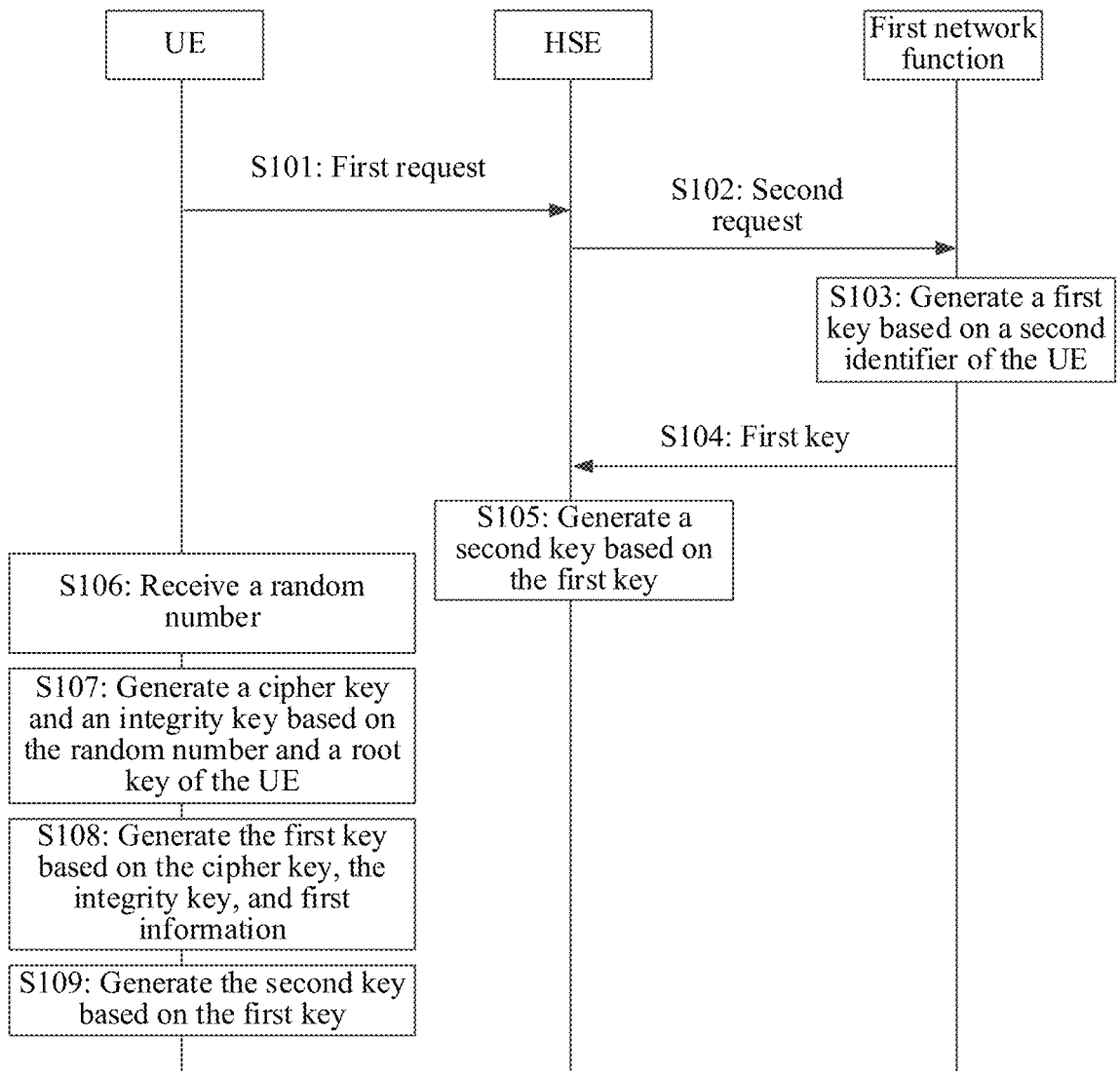
FIG. 5 is a schematic flowchart of a communication method according to an embodiment of this application.

As shown in FIG. 5, the method may include the following steps.

S101: UE sends a first request to an HSE, where the first request includes a first identifier of the UE.

Correspondingly, the HSE receives the first request from the UE, where the first request includes the first identifier of the UE.

Optionally, the first request is a session establishment request or referred to as a session request. In this case, the method provided in this embodiment of this application may be implemented with reference to a session establishment process, to provide data security protection for a session of the UE.

S102: The HSE sends a second request to a first network function, where the second request includes a second identifier of the UE. The first network function may be an AUSF and/or a UDM. For example, the second request is a request of obtaining an authentication vector. The authentication vector may be a set including a key or a parameter used to derive a key.

The second identifier may be determined based on the first identifier. For example, the first identifier may be a subscription concealed identifier (SUCI) of the UE, and the second identifier may be a subscription permanent identifier (SUPI) of the UE determined based on the SUCI. For another example, the first identifier may be an identifier allocated by the HSE to the UE, and the second identifier may be the SUPI of the UE.

In addition, the second identifier may alternatively be the same as the first identifier. For example, both the first identifier and the second identifier are the SUCI of the UE, or both are the SUPI of the UE.

Correspondingly, the first network function receives the second request from the HSE, where the second request includes the second identifier of the UE.

Optionally, if the first network function includes the UDM, the second request may be sent by the HSE to the UDM. If the first network function is the AUSF, the second request may be sent by the HSE to the AUSF. Then, the AUSF sends a new request to the UDM, where content of the new request may be the same as that of the second request.

S103: The first network function generates a first key based on the second identifier of the UE.

If the first network function is the UDM, the UDM may generate a CK and an IK of the UE based on the second identifier of the UE, and generate the first key based on the CK, the IK, and first information. The UDM may obtain a long term key of the UE based on the second identifier of the UE, and then generate the CK and the IK of the UE based on the long term key. Then, the UDM may generate the first key based on the CK, the IK, and the first information.

The first information includes at least one of a name of a serving network (SN) of the UE, an identifier of the HSE, the SUPI of the user equipment, and an identifier of a BEST service. For example, the first information may include the name of the serving network (SN) of the UE. Alternatively, the first information may be the identifier (HSE ID) of the HSE, the SUPI of the UE, and the identifier of the BEST service. Alternatively, the first information may be the name of the serving network of the UE, the identifier of the HSE, the SUPI of the UE, and the identifier of the BEST service. In addition, the first information may alternatively be other parameters shared by the UE and the HSE. These parameters need to be sent by the HSE and/or the UE to the first network function. For example, the HSE carries these parameters in the second request. Alternatively, the first information may be parameters determined by the HSE, and the HSE may send these parameters to the UE and the first network function.

For example, the first network function is the UDM, and the UDM may derive $K_{ausf}$ by using the CK and the IK as keys and by using the name of the serving network of the UE and SQN XOR AK as an input parameter. In this case, $K_{ausf}$ is the first key. Alternatively, the UDM derives $K_{best}$ by using the CK and the IK as keys or by using $K_{ausf}$ as key, and by using the identifier of the HSE, the SUPI, or the identifier of the BEST service of the UE as an input parameter. In this case, $K_{best}$ is the first key.

If the first network function is the AUSF, after receiving the second request, the AUSF sends a fourth request to the UDM, where the fourth request may carry the second identifier of the UE. The UDM may obtain the long term key of the UE based on the second identifier of the UE, and then generate the CK and the IK of the UE based on the long term key. Then, the UDM generates the fourth key based on the CK, the IK, and the first information, where the first information includes at least one of the name of the serving network of the UE, the identifier of the HSE, the SUPI of the UE, or the identifier of the BEST service. The UDM returns the fourth key to the AUSF. The AUSF generates the first key based on the fourth key and the first information. The first information may further include at least one of the identifier of the HSE, the SUPI of the UE, or the identifier of the BEST service, or include the other parameters shared by the UE and the HSE, or include the parameters determined by the HSE.

For example, the first network function is the AUSF. The UDM may derive the fourth key by using the CK and the IK as keys or by using $K_{ausf}$ as a key, and by using at least one of the name of the serving network, the SQN XOR AK, the identifier of the HSE, the SUPI of the UE, and/or the identifier of the BEST service as an input parameter. Then, the fourth key is sent to the AUSF, and the AUSF generates $K_{best'}$ based on the fourth key. In this case, $K_{best'}$ is the first key.

If the first network function is the UDM, the second request may include indication information. After receiving the indication information, the first network function may perform S104, to be specific, the first network function generates the first key based on a cipher key, an integrity key, and the first information. For example, the indication information may indicate to request a security parameter of BEST, for example, to request a BEST authentication vector or to request a BEST key. Alternatively, the indication information is used to request a 5G authentication and key agreement (AKA) authentication vector or a 5G AKA authentication key, or indicates that a requested authentication method is the 5G AKA or the BEST.

It should be noted that, in this application, the UDM may alternatively generate a security parameter of the 5G AKA or the security parameter of the BEST based on the indication information, and return the security parameter in a response, where the security parameter includes the first key. The security parameter further includes a parameter such as an authentication response. This is not limited. This explanation is applicable to all scenarios of this application, and details are not described subsequently.

If the first network function is the AUSF, the fourth request may include the indication information. After receiving the indication information, the UDM performs S103, to be specific, the UDM generates the first key based on the cipher key, the integrity key, and the first information. For example, the indication information may indicate to request the security parameter of the BEST, for example, to request the BEST authentication vector or to request the BEST key. Alternatively, the indication information is used to request the 5G AKA authentication vector or the 5G AKA authentication key, or indicates that the requested authentication method is the 5G AKA or the BEST.

If the first network function is the UDM, the HSE may use an existing service of the UDM, for example, a UE authentication service. In this case, the second request is a request of obtaining UE authentication (Nudm_UEAuthentication_Get), and the second request needs to carry the indication information. The UDM generates and returns the first key based on the indication information. This application further includes defining a new service in the UDM. In this case, the second request is another request different from the request of obtaining UE authentication, and is a service request dedicated to BEST authentication. In this case, the UDM may generate and return the first key based on the dedicated service request, and the second request does not need to carry the indication information.

If the first network function is the AUSF, the AUSF may use the existing service of the UDM, for example, the UE authentication service. In this case, the fourth request is the request of obtaining UE authentication, and the fourth request needs to carry the indication information. The UDM generates $K_{ausf}$ based on the indication information and returns $K_{ausf}$ to the AUSF. This application further includes defining a new service in the UDM. In this case, the fourth request is another request different from the request of obtaining UE authentication, and is a service request dedicated to the BEST authentication. In this case, the UDM may generate and return $K_{ausf}$ based on the dedicated service request, and the fourth request does not need to carry the indication information. The indication information may be carried by the AUSF, or may be obtained by the AUSF from the second request of the HSE and then carried in the fourth request.

S104: The first network function sends the first key to the HSE.

Correspondingly, the HSE receives the first key from the first network function.

Optionally, the first network function may send an authentication vector to the HSE, and correspondingly, the HSE receives the authentication vector. The authentication vector includes the first key. The authentication vector may further include a random number, an authentication token, and an RES or an RES*. The RES* is generated by using a CK∥IK as a key, and by using the name of the serving network of the UE, a RAND, and the RES as input parameters.

S105: The HSE generates a second key based on the first key.

The second key includes an encryption protection key and/or an integrity protection key between the UE and the HSE.

If the first request carries an encryption indication, the second key includes the encryption protection key. For example, the second key includes the encryption protection key and the integrity protection key. Alternatively, the HSE receives the encryption indication from the first network function, and the second key includes the encryption protection key. If the first request does not include the encryption indication, and the HSE does not receive the encryption indication from the first network function, the second key may be the integrity protection key, or may include the encryption protection key and the integrity protection key, provided that the confidentiality protection service is not activated and the encryption protection key is not used.

Optionally, if the HSE receives the authentication vector, the HSE may generate the second key based on the authentication vector.

In addition, optionally, after S101, the HSE determines whether the UE has a valid key. If the UE has a valid key, S102 to S104 are skipped, and S105 is performed; if the HSE determines that the UE does not have a valid key, S102 to S105 may be performed. Subsequently, in this application, the valid key includes the first key or the second key.

Optionally, the valid key of the UE may be obtained by the HSE in a process in which the UE establishes a session previously. The HSE may store a correspondence between the SUPI and the valid key of the UE. After receiving the SUPI carried in the first request, the HSE may query, based on the SUPI, whether the UE has the valid key. Alternatively, after receiving the SUCI of the UE or the identifier allocated by the HSE to the UE that is carried in the first request, the HSE may obtain the SUPI of the UE based on the SUCI of the UE or the identifier allocated by the HSE to the UE, and query, based on the SUPI, whether the UE has the valid key.

S106: The UE receives the random number.

The random number may be sent by the HSE. For example, after S104, the HSE sends the random number to the UE.

Optionally, the random number is carried in a session start message. The authentication token may also be sent in the session start message.

S107: The UE generates the cipher key and the integrity key based on the random number and a root key of the UE.

Optionally, the CK is related to the RAND, or the CK is determined based on the RAND.

Optionally, the IK is related to the RAND, or the IK is determined based on the RAND.

S108. The UE generates the first key based on the cipher key, the integrity key, and the first information.

For the first information and the first key, refer to the description in S103.

S109: The UE generates the second key based on the first key, where the second key includes the encryption protection key and/or the integrity protection key between the UE and the HSE.

Optionally, in S105 and S108, the UE and/or the HSE may generate the second key based on the first key and second information. The second information may include at least one of the identifier of the HSE, an algorithm type identifier of the BEST service of the UE, a sequence number of the UE used for calculating the authentication token, an anonymity key (AK), the SUPI of the UE, the random number, or the authentication token.

According to the foregoing method, the HSE may obtain the first key, where the first key is generated based on the cipher key, the integrity key, and the first information. Therefore, the HSE can obtain the first key without obtaining the cipher key and the integrity key of the UE, and may subsequently generate, based on the first key, the security key used to protect user equipment data. Therefore, this solution can provide a security key obtaining manner applicable to a 5G network architecture, and can reduce a data security risk of the user equipment.

The following describes, by using an example, a manner of determining the first key in S104 and/or S109. The first key may be $K_{ausf}$, $K_{best}$, or $K_{best''}$.

(1) If the first key is $K_{ausf}$, $K_{ausf}$ may be determined based on the CK, the IK, and at least one of the name of the serving network, or the sequence number (SQN) or the AK that are used to determine the authentication token of the UE. For example, $K_{ausf}$ may be determined based on the CK and the IK, the name of the serving network, a length of the name of the serving network, the SQN XOR the AK, and a length of the SQN XOR the AK and by using a key derivation function (KDF). For example, the key derivation function is a secure hash algorithm 256 (SHA-256) function, and the secure hash algorithm 256 is one of hash-based message authentication code (HMAC) algorithms.

In this application, the name of the serving network of the UE may be carried in the first request and sent to the HSE, and is sent by the HSE to the UDM by using the second request or by the AUSF to the UDM by using the fourth request. Alternatively, the UDM uses the stored name of the serving network with which the UE is authenticated or the stored name of the serving network with which the UE is registered. If the HSE carries the name of the serving network of the UE in the second request or the AUSF carries the name of the serving network of the UE in the fourth request, the UDM may further determine, based on the name of the serving network with which the UE is authenticated or the name of the serving network with which the UE is registered, whether the name of the serving network carried in the HSE is correct.

Optionally, the AK may be related to the RAND. For example, the AK is determined based on the RAND.

(2) If the first key is $K_{best}$, and $K_{best}$ is a key derived from $K_{ausf}$, a derivation manner may be that $K_{ausf}$ is used as a key, an additional parameter is an input parameter, and a new key is generated by using an HMAC algorithm. For example, the new key is determined based on formula 1. Optionally, the additional parameter may be the identifier of the HSE, the SUPI, the identifier of the BEST service, or the like. This is not limited.

In this case, the HSE may directly obtain $K_{best}$ or the authentication vector including $K_{best}$ from the UDM, or may obtain $K_{best}$ or the authentication vector including $K_{best}$ from the UDM via the AUSF. If the HSE obtains $K_{best}$ or the authentication vector including $K_{best}$ from the UDM via the AUSF, the authentication vector sent by the UDM to the AUSF includes at least one of $K_{ausf}$, the RAND, an AUTN, the RES, or the RES*, the AUSF further derives $K_{best}$ based on $K_{ausf}$. Alternatively, the UDM may derive $K_{best}$, and the AUSF forwards Km to the HSE, or forwards the authentication vector including $K_{best}$.

The AUTN may be derived based on the SQN, the AK, an AMF value, and a MAC value. The AMF value is a 16-bit field, and may be set. The MAC value may be derived from the SQN, the RAND, and the AMF value.

(3) If the first key is $K_{best'}$, optionally, $K_{best'}$ may be determined based on the CK, the IK, and at least one of the name of the serving network of the UE, the identifier of the HSE, the SUPI, or the identifier of the BEST service.

Figure 6:
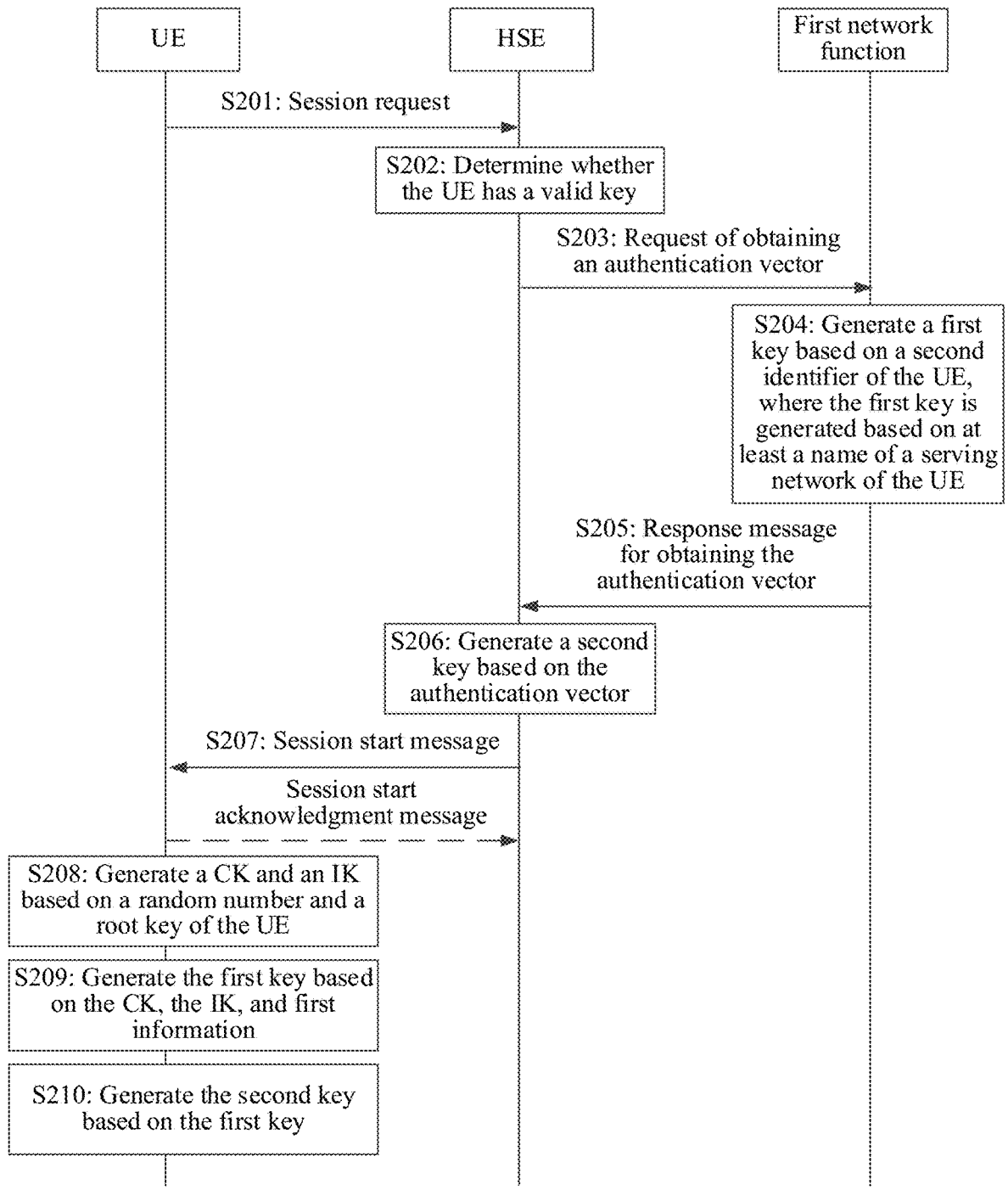
FIG. 6 is a schematic flowchart of another communication method according to an embodiment of this application.

It should be understood that, in the procedure shown in FIG. 6, the CK may be replaced with a CK', and the IK may be replaced with an IK'. In this case, the UE primary authentication manner in the 5G system may be an extensible authentication protocol-authentication and key agreement' (EAP-AKA'). The CK' and the IK' may be derived based on the CK and the IK.

The following describes a method for determining, by the HSE based on the first identifier of the UE, the second identifier of the UE involved in S102.

Method 1: The first identifier may be the SUCI, the second identifier is the SUPI, and the HSE may determine the second identifier by using the UDM.

The UDM may decrypt the SUCI to obtain the SUPI. Therefore, when obtaining the SUCI carried in the first request, the HSE may send the SUCI of the UE to the UDM, request the SUPI of the UE, and then receive the SUPI returned by the UDM. The HSE may send a third request to the UDM, where the third request carries the SUCI of the UE. The third request may be a request of obtaining a UE identifier. After decrypting the SUPI, the UDM may send a response message for obtaining the UE identifier to the HSE, where the response message for obtaining the UE identifier carries the SUPI of the UE.

Method 2: The first identifier may be the SUCI, the second identifier is the SUPI, and the HSE may locally process the first identifier to obtain the second identifier.

Because the SUCI may be obtained by encrypting the SUPI, the HSE may store a key that can be used to decrypt the SUCI to obtain the SUPI. For example, the UE encrypts the SUPI based on a public key of the HSE to obtain the SUCI, and the SUCI is carried in the first request. After receiving the first request, the HSE may decrypt the SUCI in the first request based on a private key of the HSE, to obtain the SUPI of the UE.

Method 3: The first identifier may be an identifier allocated by the HSE to the UE, the second identifier is the SUPI, and the HSE may obtain the second identifier after locally processing the first identifier.

The HSE may store a correspondence between the identifier allocated by the HSE to the UE and the SUPI of the UE, to determine the SUPI of the UE corresponding to the identifier in the first request.

For example, in a previous process in which the UE accesses a network or establishes a session, the HSE allocates an identifier to the UE based on the SUPI of the UE. In this case, the HSE may store a correspondence between the identifier of the UE and the SUPI of the UE, and determine, based on the correspondence, the SUPI of the UE corresponding to the identifier of the UE carried in the first request before sending the second request.

Optionally, before S102, if the HSE determines, based on the first identifier or the second identifier of the user equipment, that the UE has the valid key, S102 to S104 may be skipped, and S105 is performed.

As shown in FIG. 6, based on the procedure shown in FIG. 5, if the first information includes the name of the serving network of the UE, an example communication method provided in this embodiment of this application may include the following steps:

S201: The UE sends the session request to the HSE, where the session request carries the first identifier of the UE.

Optionally, the session request may further include the name of the serving network and/or the encryption indication of the UE. The encryption indication may be used to request an encryption service.

S202: The HSE determines whether the UE has the valid key, and if the UE does not have the valid key, S203 is performed, or if the UE has the valid key, S206 is performed.

The first identifier is the SUPI of the UE. Alternatively, the first identifier is the SUCI or an identifier allocated by the HSE, and the HSE determines the SUPI of the UE based on the first identifier.

S203: The HSE sends the request of obtaining the authentication vector to the first network function, where the request of obtaining the authentication vector carries the second identifier of the UE. Optionally, if the session request includes the name of the serving network of the UE, the request of obtaining the authentication vector may include the name of the serving network of the UE.

The first network function may be the UDM or the AUSF. For a specific implementation of the UDM or the AUSF, refer to the description in S103.

S204: The first network function generates the first key based on the second identifier of the UE, where the first information needs to be used as an input parameter in a process of generating the first key. The first information includes at least the name of the serving network of the UE. The first information may further include at least one of the identifier of the HSE, the SUPI of the UE, or the identifier of the BEST service. In other words, the first key is generated based on at least the identifier of the name of the serving network of the UE.

Optionally, if the second request does not carry the name of the serving network of the UE, the first network function may obtain the name of the serving network of the UE based on the second identifier of the UE. For example, the first network function is the UDM, and the UDM may obtain the name of the serving network of the UE based on the second identifier of the UE. If the first network function is the AUSF, the AUSF may query the UDM for the name of the serving network of the UE based on the second identifier of the UE.

S205: The first network function sends the response message for obtaining the authentication vector to the HSE, where the response message for obtaining the authentication vector carries the authentication vector, and the authentication vector includes at least the first key.

Optionally, the authentication vector may further include at least one of the RAND, the AUTN, the RES, or the RES*.

Optionally, the response message for obtaining the authentication vector may further include the encryption indication.

S206: The HSE generates the second key based on the authentication vector.

If the first request includes the encryption indication, and/or the HSE receives the encryption indication (for example, carried in the response message for obtaining the authentication vector or another message) from the first network function, the HSE determines, based on the encryption indication, whether to activate the confidentiality protection service with the UE.

S207: The HSE sends the session start message to the UE. The session start message may include the RAND, or the HSE sends the RAND to the UE by using another message.

For a manner of obtaining the RAND, refer to an existing standard. This is not specifically limited in this application.

Optionally, the session start message carries the identifier allocated by the HSE to the UE.

Optionally, after receiving the session start message, the UE may send a session start acknowledgment message to the HSE.

S208: The UE generates the CK and the IK based on the random number and the root key of the UE.

S209: The UE generates the first key based on the CK, the IK, and the first information.

The first information herein is the same as the first information used to generate the first key in S204.

S210: The UE generates the second key based on the first key.

It should be understood that a time sequence of S207 to S210 and S206 is not strictly limited. For example, S207 to S210 may be performed before or after S206.

Based on the procedure shown in FIG. 6, the UE and the HSE may separately obtain the second key. At least the name of the serving network of the UE is introduced in a process of generating the second key. Therefore, the HSE does not need to know the CK and the IK, and can be applicable to the 5G network architecture. In addition, the method shown in FIG. 6 is initiated based on the first identifier of the UE, and is performed between the HSE and the first network function based on the second identifier of the UE, without introducing the IMSI of the UE. Therefore, the method can be better applicable to the 5G network architecture to support 5G BEST. If the first identifier is the SUCI, a requirement that the UE performs communication by using the SUCI to protect SUPI transmission security is further met.

Based on the procedure shown in FIG. 6, if the encryption service needs to be enabled, the UE may carry the encryption indication in the session request, and the HSE may generate the encryption protection key based on the encryption indication.

Figure 7:
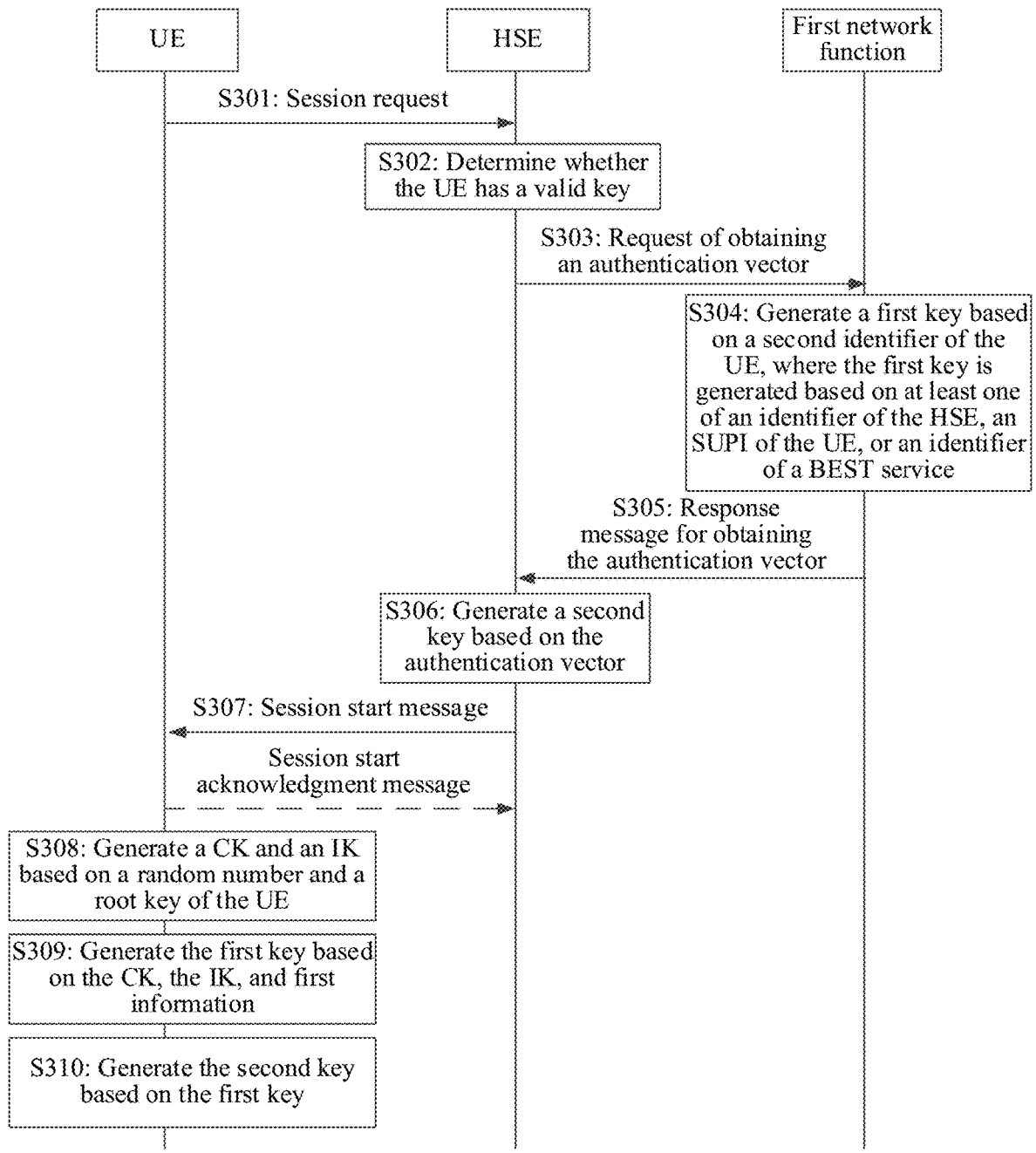
FIG. 7 is a schematic flowchart of another communication method according to an embodiment of this application.

As shown in FIG. 7, based on the procedure shown in FIG. 5, if the first information does not include the name of the serving network of the UE, the communication method provided in this embodiment of this application includes the following steps:

S301: The UE sends the session request to the HSE, where the session request carries the first identifier of the UE.

Optionally, the session request may further include the name of the serving network of the UE. The name of the serving network of the UE may indicate to obtain the encryption service.

S302: The HSE determines whether the UE has the valid key, and if the UE does not have the valid key, S303 is performed, or if the UE has the valid key, S306 is performed.

The first identifier is the SUPI of the UE. Alternatively, if the first identifier is the SUCI or the identifier allocated by the HSE, the HSE determines the SUPI of the UE based on the first identifier.

S303: The HSE sends the request of obtaining the authentication vector to the first network function, where the request of obtaining the authentication vector carries the second identifier of the UE.

The first network function may be the UDM or the AUSF. For the specific implementation of the UDM or the AUSF, refer to the description in S103.

S304: The first network function generates the first key based on the second identifier of the UE, where the first information needs to be used as the input parameter in the process of generating the first key. The first information may include at least one of the identifier of the HSE, the SUPI of the UE, or the identifier of the BEST service. In other words, the first key is generated based on at least one of the identifier of the HSE, the SUPI of the UE, or the identifier of the BEST service.

S305: The first network function sends a response message for obtaining the authentication vector to the HSE, where the response message for obtaining the authentication vector carries the authentication vector, and the authentication vector includes at least the first key.

Optionally, the authentication vector may further include at least one of the RAND, the AUTN, the RES, or the RES*.

Optionally, the response message for obtaining the authentication vector may further include the encryption indication.

S306: The HSE generates the second key based on the authentication vector.

If the first request includes the name of the serving network of the UE, and/or the HSE receives the encryption indication (for example, carried in the response message for obtaining the authentication vector or another message) from the first network function, the HSE determines, based on the name of the serving network or the encryption indication, whether to activate the confidentiality protection service with the UE.

S307: The HSE sends the session start message to the UE.

The session start message may include the RAND, or the HSE sends the RAND to the UE by using another message. For the manner of obtaining the RAND, refer to the existing standard. This is not specifically limited in this application.

Optionally, after receiving the session start message, the UE may send the session start acknowledgment message to the HSE.

S308: The UE generates the CK and the IK based on the random number and the root key of the UE.

S309: The UE generates the first key based on the CK, the IK, and the first information.

The first information herein is the same as the first information used to generate the first key in S204.

S310: The UE generates the second key based on the first key.

It should be understood that a time sequence of S307 to S310 and S306 is not strictly limited. For example, S307 to S310 may be performed before or after S306.

Based on the procedure shown in FIG. 7, the UE and the HSE may separately obtain the second key. At least one of the RAND, the AUTN, the RES, or the RES* is introduced in the process of generating the second key. Therefore, the HSE does not need to know the CK and the IK, and can be applicable to the 5G network architecture. In addition, the method shown in FIG. 7 is initiated based on the first identifier of the UE, and is performed between the HSE and the first network function based on the second identifier of the UE, without introducing the IMSI of the UE. Therefore, the method can be better applicable to the 5G network architecture to support the 5G BEST. If the first identifier is the SUCI, the requirement that the UE performs communication by using the SUCI to protect the SUPI transmission security is further met.

Based on the procedure shown in FIG. 7, if the encryption service needs to be enabled, the UE may carry the name of the serving network in the session request, and the HSE may generate the encryption protection key based on the name of the serving network.

In another communication method provided in an embodiment of this application, implicit authentication may be performed by using $K_{ausf}$ generated during primary authentication between UE and a PLMN, and an explicit authentication manner in 4G BEST is not used. The implicit authentication means that authentication of an AUTN and a RES does not need to be performed between the UE and an HSE, and an explicit authentication means that authentication of the AUTN and the RES needs to be performed between the UE and the HSE first, and then a key is generated.

A prerequisite for this implementation is that the UE and a network have completed primary authentication, and both the UE and the AUSF have obtained $K_{ausf}$ in the primary authentication. If the UE has subscribed to a BEST service, a UDM also returns BEST indication when returning an authentication vector to an AUSF during the primary authentication. The authentication vector may include $K_{ausf}$ and at least one of a RAND, the AUTN, or the RES. The AUSF sends generated $K_{best}$ and a key ID to the HSE based on the indication.

Subsequently, the UE may generate $K_{best}$ and the key ID based on K and send a session request carrying the key ID to the HSE. The HSE finds the corresponding $K_{best}$ based on the key ID, in other words, the HSE obtains $K_{best}$ of the UE. In this case, the UE and the HSE can also share the same $K_{best}$. Then, $K_{best}$ is used as a root key to derive a subsequent E2M or E2E key. Code of the BEST service, a SUPI, an HSE ID, and other parameters can be used to generate $K_{best}$. The SUPI and a code of the key ID can be used to calculate the key ID. All derived keys can use $K_{ausf}$.

Optionally, in a process in which the AUSF and/or the UE generate/generates $K_{best}$, $K_{ausf}$ may be used as a key, and parameters such as the code of the BEST service, the SUPI, or an identifier of the HSE may be used as an additional parameter. Similarly, in a process of generating the key ID, $K_{ausf}$ may be used as a key, and a parameter such as the SUPI or the code of the key ID may be used as an additional parameter.

For example, the code of the key ID is related to a BEST temporary UE identifier (B-TID) or an authentication and key management for applications (AKMA) temporary UE identifier (A-TID), for example, a character string such as a B-TID or an A-TID.

Figure 8:
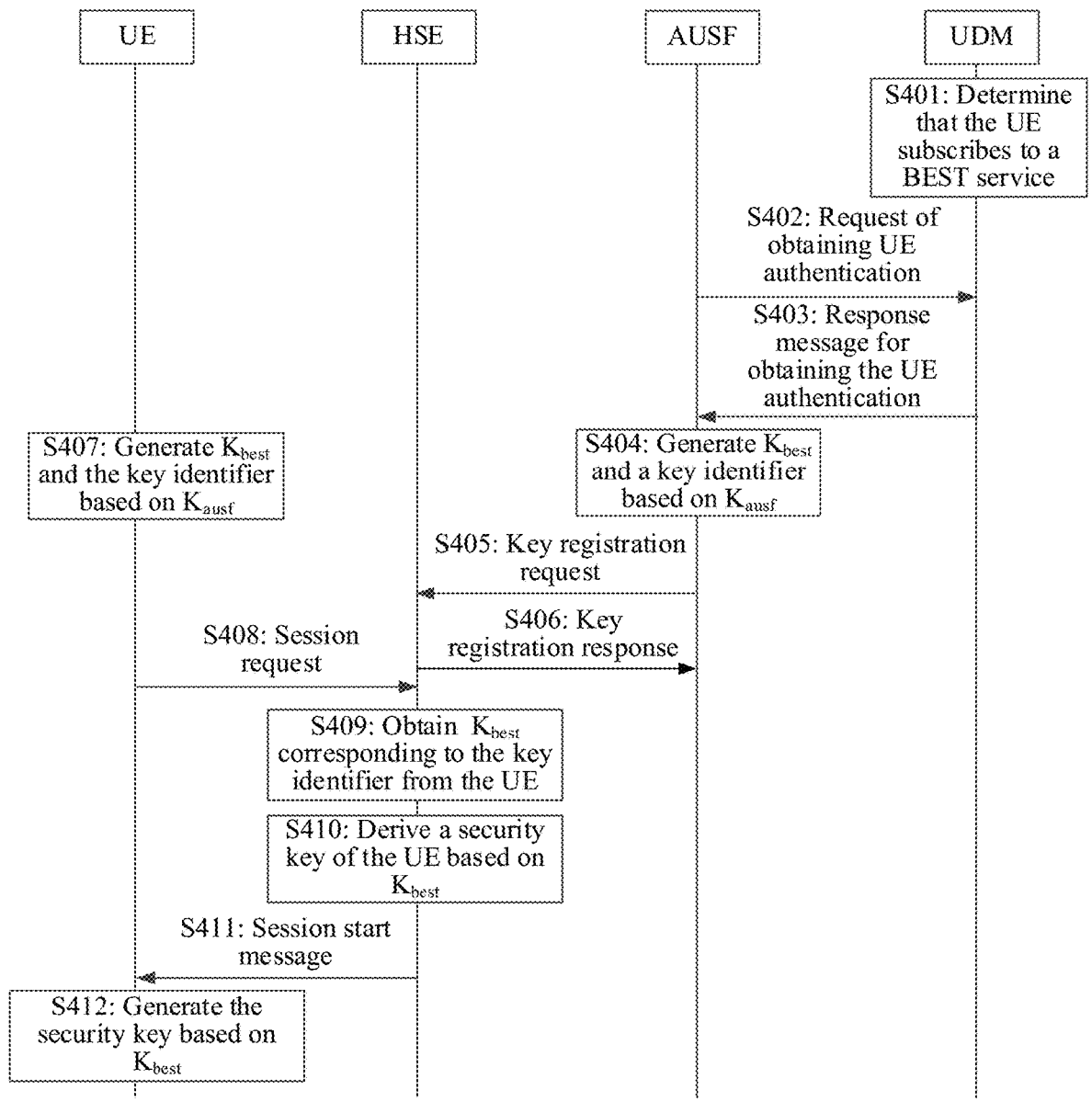
FIG. 8 is a schematic flowchart of another communication method according to an embodiment of this application.

As shown in FIG. 8, when implicit authentication is performed by using $K_{ausf}$ generated during primary authentication between UE and a PLMN, the communication method provided in an embodiment of this application may include the following steps:

S401: A UDM determines that UE subscribes to a BEST service.

The UDM may query subscription data of the UDM, to determine whether the UE subscribes to the BEST service.

S402: An AUSF sends a request of obtaining UE authentication to the UDM.

A time sequence of performing S401 and S402 is not strictly limited in this application.

S403: The UDM returns a response message for obtaining the UE authentication to the AUSF, where the response message for obtaining the UE authentication carries a SUPI of the UE and indication information.

The indication information may be BEST indication, in other words, the indication information indicates that the UE needs to use a BEST service.

S404: After receiving the indication information, the AUSF generates $K_{best}$ and a key ID based on $K_{ausf}$.

Optionally, the AUSF stores a correspondence between $K_{best}$ and the key ID.

S405: The AUSF sends a key registration request to the HSE, where the key registration request carries the SUPI of the UE, $K_{best}$, and the key ID.

S406: The HSE returns a key registration response to the AUSF.

S407: The UE generates $K_{best}$ and the key ID based on $K_{ausf}$.

S407 may be performed before or after the UE sends a session request, or may be performed after $K_{ausf}$ is generated. This is not specifically limited. For example, when the UE wants to establish a session, the UE generates $K_{best}$ and the key ID.

S408: The UE sends the session request to the HSE, where the session request carries the key ID.

S409: The HSE obtains Km corresponding to the key ID from the UE.

S410: The HSE generates a security key of the UE based on $K_{best}$.

The security key of the UE includes an encryption protection key and/or an integrity protection key.

S411: The HSE sends a session start message to the UE.

S412: The UE generates the security key based on Kb.

The security key of the UE includes the encryption protection key and/or the integrity protection key.

Based on the procedure shown in FIG. 8, the HSE may query $K_{best}$ based on the key ID of the UE, to obtain the encryption protection key and/or the integrity protection key of the UE based on $K_{best}$. In this process, a result and key of a primary authentication of the UE are reused to complete key sharing between the UE and the HSE, so that an independent authentication procedure between the UE and the HSE is saved, and an energy saving requirement of BEST is better met.

In another communication method provided in an embodiment of this application, a manner of key generation in a 4G network architecture may be used. A UDM provides a CK and an IK for an HSE, and UE and the HSE generate a BEST key based on the CK and the IK.

Optionally, the HSE may send a request of obtaining UE authentication to the UDM. After receiving the request of obtaining UE authentication, the UDM may generate a third key, or generate the third key by using a new service other than a UE authentication service. The third key may include the CK and the IK.

For example, if the request of obtaining UE authentication carries indication information, the UDM may generate the third key based on the indication information; otherwise, the UDM may generate the third key by using another service other than the UE authentication service. The indication information herein may indicate to request a security parameter of BEST, for example, to request a BEST authentication vector or to request a BEST key. Alternatively, the indication information is used to request a 5G authentication and key agreement authentication vector or a 5G AKA authentication key, or indicates that a requested authentication method is 5G AKA or the BEST.

Then, the UDM may send an authentication vector to the HSE, where the authentication vector includes the third key, and may further include at least one of a RAND, an AUTN, or an RES. After receiving the authentication vector, the HSE generates a security key of UE. Correspondingly, the UE generates the security key based on a same parameter. The security key of the UE includes an encryption protection key and/or an integrity protection key.

Figure 9:
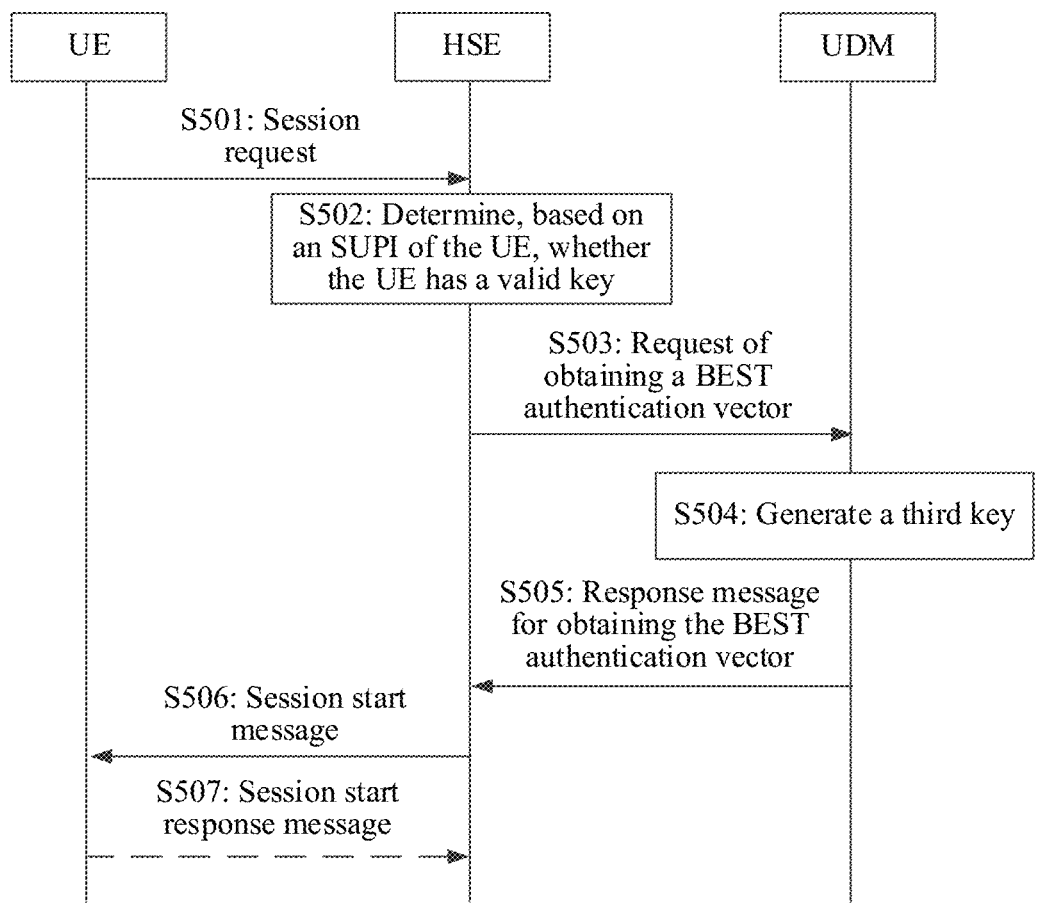
FIG. 9 is a schematic flowchart of another communication method according to an embodiment of this application.

As shown in FIG. 9, a process in which the UE and the HSE generate an authentication key based on the CK and the IK may include the following steps:

S501: The UE sends a session request to the HSE, where the session request carries a SUPI of the UE.

S502: The HSE determines, based on the SUPI of the UE, whether the UE has a valid key.

If the UE has the valid key, the authentication key of the UE may be generated based on the valid key, and then S506 is performed. If the UE does not have the valid key, S503 is performed.

S503: The HSE sends a request of obtaining a BEST authentication vector to the UDM, where the request of obtaining the BEST authentication vector carries the SUPI of the UE.

S504: After receiving the request of obtaining the BEST authentication vector, the UDM generates the third key.

S505: The UDM sends a response message for obtaining the BEST authentication vector to the HSE, where the response message for obtaining the BEST authentication vector carries the authentication vector, and the authentication vector includes the third key, and may further include at least one of the RAND, the AUTN, or the RES.

Then, the HSE may generate the security key of the UE based on the third key.

The security key of the UE includes the encryption protection key and/or the integrity protection key. Correspondingly, a same UE security key, in other words, the encryption protection key and/or the integrity protection key, may be generated on the UE side.

S506: The HSE sends a session start message to the UE.

S507: Optionally, the UE returns a session start response message to the HSE.

According to the method in FIG. 9, an authentication vector consistent with a 4G BEST authentication vector may be obtained from the UDM, so that the UE and the HSE can be better compatible with an existing security design when completing authentication and key generation, because a change on the UE side is small.

In another communication method provided in an embodiment of this application, when UE accesses a 4G network, an HSE may obtain an authentication vector by using an HSS. In other words, the HSS requests a UDM to obtain the authentication vector, and then the HSS sends the authentication vector to the HSE.

When the UE accesses the 4G network, a carried identifier of the UE is an IMSI.

Optionally, the HSS may send a request of obtaining UE authentication to the UDM. After receiving the request of obtaining UE authentication, the UDM may generate a fourth key, or generate the fourth key by using a new service other than a UE authentication service. For example, if the request of obtaining UE authentication carries indication information, the UDM may generate the fourth key based on the indication information; otherwise, the UDM may generate the fourth key by using another service other than the UE authentication service. The indication information herein may indicate to request a security parameter of BEST, for example, to request a BEST authentication vector or to request a BEST key. Alternatively, the indication information is used to request a 5G authentication and key agreement authentication vector or a 5G AKA authentication key, or indicates that a requested authentication method is 5G AKA or the BEST. The fourth key may include a CK and an IK.

Then, the UDM may send an authentication vector to the HSS, where the authentication vector includes the fourth key, and may further include at least one of a RAND, an AUTN, or an RES. The HSS forwards the authentication vector to the HSE, and the HSE receives the authentication vector and generates a security key for the UE. Correspondingly, the UE generates the security key based on a same parameter. The security key of the UE includes an encryption protection key and/or an integrity protection key.

Figure 10:
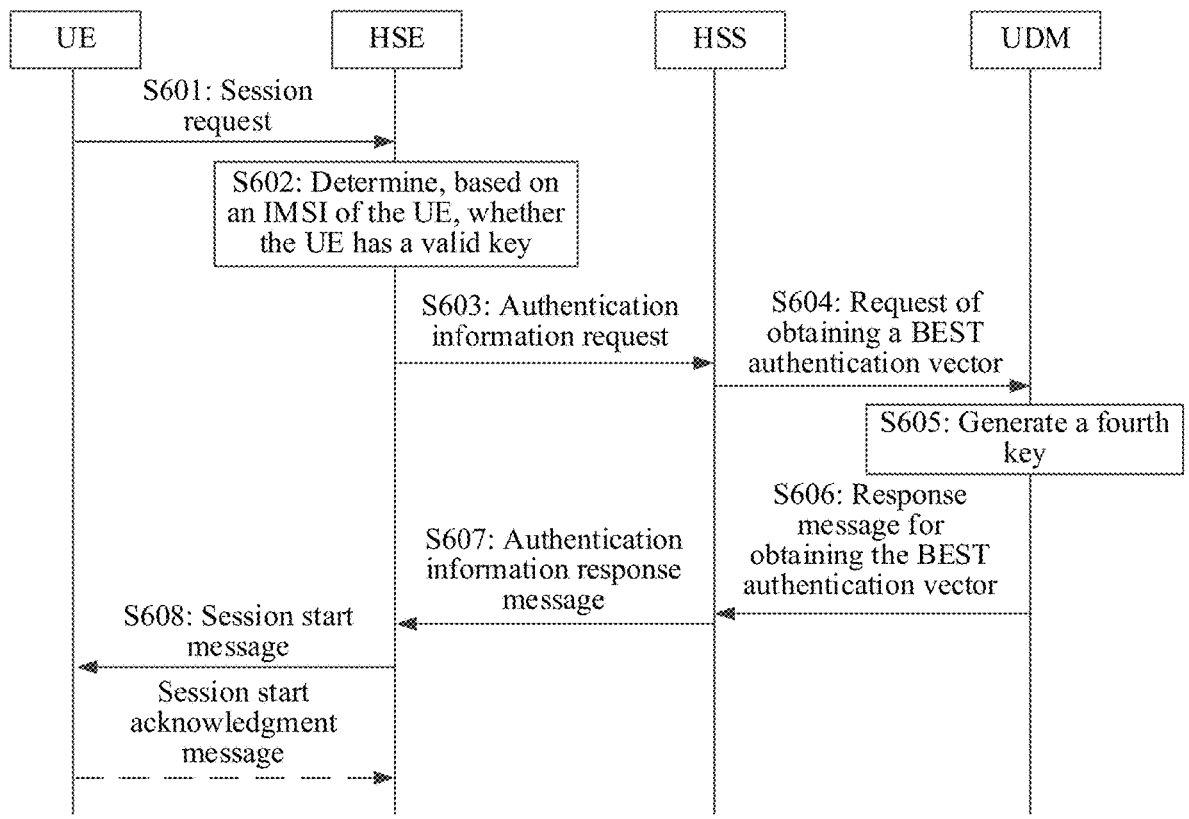
FIG. 10 is a schematic flowchart of another communication method according to an embodiment of this application.

As shown in FIG. 10, that the UE and the HSE generate an authentication key based on the CK and the IK may include the following steps:

S601: The UE sends a session request to the HSE, where the session request carries an IMSI of the UE.

S602: The HSE determines, based on the IMSI of the UE, whether the UE has a valid key.

If the UE has the valid key, the authentication key of the UE may be generated based on the valid key, and then S608 is performed. If the UE does not have the valid key, S603 is performed.

S603: The HSE sends an authentication information request to the HSS, where the authentication information request carries the IMSI of the UE.

S604: The HSS sends a request of obtaining a BEST authentication vector to the UDM, where the request of obtaining the BEST authentication vector carries the IMSI of the UE.

S605: The UDM generates the fourth key after receiving the request of obtaining the BEST authentication vector.

S606: The UDM sends a response for obtaining the BEST authentication vector to the HSS, where the response for obtaining the BEST authentication vector carries the authentication vector, and the authentication vector includes the fourth key, and may further include at least one of the RAND, the AUTN, or the RES.

S607: The HSS sends an authentication information response message to the HSE, where the response message carries the authentication vector, and the authentication vector includes the fourth key, and may further include at least one of the RAND, the AUTN, or the RES.

Then, the HSE may generate the security key of the UE based on the fourth key.

The security key of the UE includes the encryption protection key and/or the integrity protection key. Correspondingly, a same encryption protection key and/or integrity protection key may be generated on the UE side.

S608: The HSE sends a session start message to the UE.

Optionally, after receiving the session start message, the UE returns a session start response message to the HSE.

According to the method in FIG. 10, when the UE accesses the 4G network, the authentication vector may be obtained from the UDM by using the HSS, so that the UE can also access a BEST service by using a 5G credential when accessing the 4G network.

In addition, similar to the procedure shown in FIG. 9, the HSE may also directly send a request of obtaining an authentication service to the UDM. A difference lies in that the request of obtaining the authentication service herein carries the IMSI of the UE.

Figure 11:
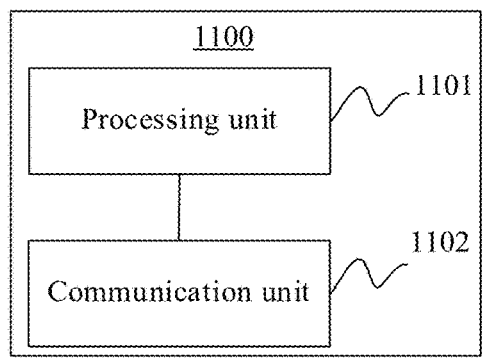
FIG. 11 is a schematic diagram of a structure of a communication apparatus according to an embodiment of this application.

Same as the foregoing concept, as shown in FIG. 11, an embodiment of this application further provides an apparatus 1101, configured to implement the foregoing methods. For example, the apparatus may be a software module or a chip system. In this embodiment of this application, the chip system may include a chip, or may include a chip and another discrete component. The apparatus 1100 may include a processing unit 1101 and a communication unit 1102.

It should be understood that the apparatus may include the HSE, the UDM, or the UE shown in the foregoing method embodiments, or include an apparatus having a function of the HSE, the UDM, or the UE shown in the foregoing method embodiments.

In this embodiment of this application, the communication unit may also be referred to as a transceiver unit, and may include a sending unit and/or a receiving unit, which are respectively configured to perform the steps of sending and receiving by the HSE, the UDM or the UE in the foregoing method embodiments.

Figure 12:
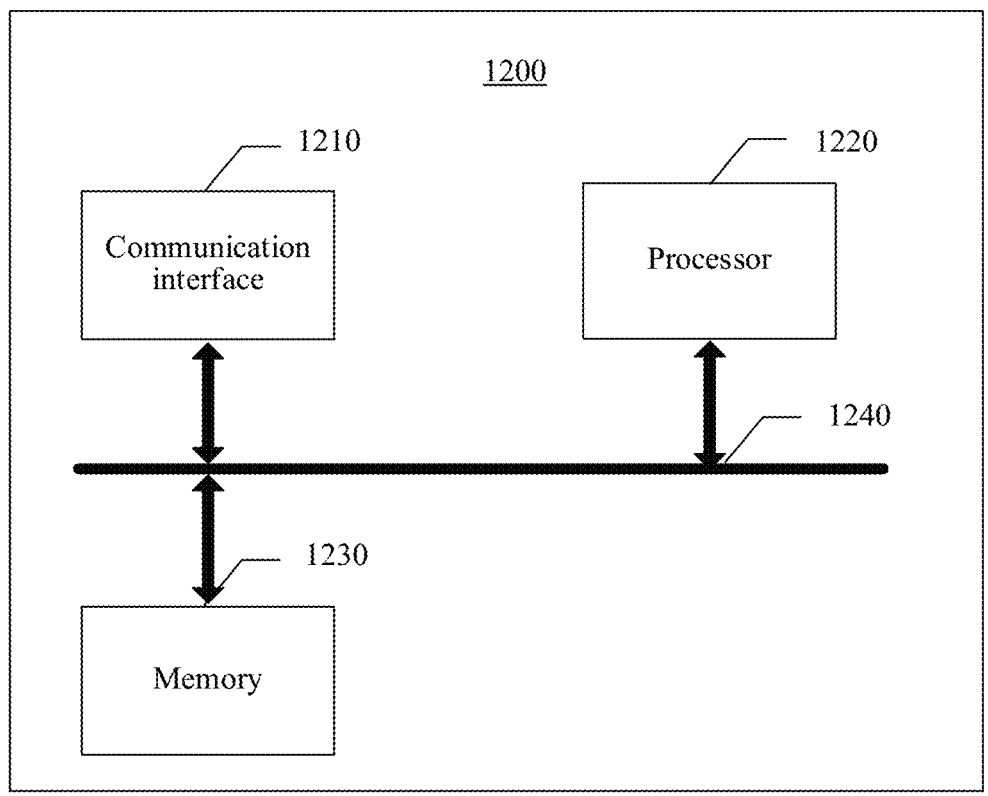
FIG. 12 is a schematic diagram of a structure of another communication apparatus according to an embodiment of this application.

The following describes in detail a communication apparatus provided in embodiments of this application with reference to FIG. 11 and FIG. 12. It should be understood that descriptions of apparatus embodiments correspond to the descriptions of the method embodiments. Therefore, for content that is not described in detail, refer to the foregoing method embodiments. For brevity, details are not described herein again.

The communication unit 1102 may also be referred to as a transceiver, a transceiver machine, a transceiver apparatus, or the like. The processing unit 1101 may also be referred to as a processor, a processing board, a processing module, a processing apparatus, or the like. Optionally, a component that is in the communication unit 1102 and that is configured to implement a receiving function may be considered as a receiving unit, and a component that is in the communication unit 1102 and that is configured to implement a sending function may be considered as a sending unit. In other words, the communication unit 1102 includes the receiving unit and the sending unit. The communication unit 1102 sometimes may also be referred to as the transceiver machine, the transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

For example, if the apparatus 1100 is an HSE, the communication unit 1102 may be configured to receive a first request from UE, where the first request includes a first identifier of the UE. The communication unit 1102 may be further configured to send a second request to a first network function. The second request includes a second identifier of the UE, and the second identifier is determined based on the first identifier, or the second identifier is the same as the first identifier. The communication unit 1102 may be further configured to receive a first key from the first network function. The first key is generated based on a cipher key, an integrity key, and first information. The processing unit 1101 may be configured to generate a second key based on the first key. The second key includes an encryption protection key and/or an integrity protection key between the UE and the HSE. The first information includes at least one of a name of a serving network of the UE, an identifier of the HSE, a SUPI of the UE, and an identifier of a BEST service.

Optionally, the communication unit and the processing unit may further perform other operations. For example, the communication unit 1102 is configured to perform a sending operation and a receiving operation of the HSE in the method embodiments shown in FIG. 5 to FIG. 10, and the processing unit 1101 is configured to perform other operations of the HSE in the method embodiments shown in FIG. 5 to FIG. 10 except the sending and receiving operations. For details, refer to the foregoing descriptions. Details are not described herein again.

For another example, if the apparatus 1101 is a UDM, the communication unit 1102 may be configured to receive the second request from an HSE. The second request includes the second identifier of the UE. The processing unit 1101 may be configured to generate the cipher key and the integrity key of the UE based on the second identifier, and generate the first key based on the cipher key, the integrity key, and the first information. The communication unit 1102 may be further configured to send the first key to the HSE. The first information includes at least one of the name of the serving network of the UE, the identifier of the HSE, the SUPI of the UE, and the identifier of the BEST service.

Optionally, the communication unit and the processing unit may further perform other operations. For example, the communication unit 1102 is configured to perform the sending operation and the receiving operation of the UDM in the method embodiments shown in FIG. 5 to FIG. 10, and the processing unit 1101 is configured to perform other operations of the UDM in the method embodiments shown in FIG. 5 to FIG. 10 except the sending and receiving operations. For details, refer to the foregoing descriptions. Details are not described herein again.

For another example, if the apparatus 1101 is the UE, the communication unit 1102 may be configured to send the first request to the HSE. The first request includes the identifier of the UE, and receives a random number sent by the HSE. The processing unit 1101 may be configured to generate the cipher key and the integrity key based on the random number and a root key of the UE, generate the first key based on the cipher key, the integrity key, and the first information, and generate the second key based on the first key. The second key includes the encryption protection key and/or the integrity protection key between the UE and the HSE. The first information includes at least one of the name of the serving network of the UE, the identifier of the HSE, the SUPI of the UE, and the identifier of the BEST service.

Optionally, the communication unit and the processing unit may further perform other operations. For example, the communication unit 1102 is configured to perform the sending operation and the receiving operation of the UDM in the method embodiments shown in FIG. 5 to FIG. 10, and the processing unit 1101 is configured to perform other operations of the UDM in the method embodiments shown in FIG. 5 to FIG. 10 except the sending and receiving operations. For details, refer to the foregoing descriptions. Details are not described herein again.

FIG. 12 shows another communication apparatus according to an embodiment of this application. The apparatus shown in FIG. 12 may be an implementation of a hardware circuit of the apparatus shown in FIG. 11. The communication apparatus is applicable to the foregoing flowchart, and performs functions of the HSE, the UDM, or the UE in the foregoing method embodiments. For ease of description, FIG. 12 merely shows main components of the communication apparatus.

The apparatus 1200 may further include at least one memory 1230, configured to store program instructions and/or data. The memory 1230 is coupled to a processor 1220. The coupling in this embodiment of this application may be an indirect coupling or a communication connection between apparatuses, units, or modules in an electrical form, a mechanical form, or another form, and is used for information exchange between the apparatuses, the units, or the modules. The processor 1220 may operate in collaboration with the memory 1230. The processor 1220 may execute the program instructions stored in the memory 1230. At least one of the at least one memory may be included in the processor.

The apparatus 1200 shown in FIG. 12 includes at least one processor 1220 and a communication interface 1210. The processor 1220 is configured to execute instructions or a program stored in the memory 1230. When the instructions or the program stored in the memory 1230 is executed, the processor 1220 is configured to perform an operation performed by the processing unit 1101 in the foregoing embodiment, and the communication interface 1210 is configured to perform an operation performed by the communication unit 1102 in the foregoing embodiment.

In this embodiment of this application, the communication interface may be a transceiver, a circuit, a bus, a module, or a communication interface of another type. In this embodiment of this application, when the communication interface is a transceiver, the transceiver may include an independent receiver and an independent transmitter, or may be a transceiver or a communication interface integrated with sending and receiving functions.

The apparatus 1200 may further include a communication line 1240. The communication interface 1210, the processor 1220, and the memory 1230 may be connected to each other through the communication line 1240. The communication line 1240 may be the peripheral component interconnect (PCI) bus, the extended industry standard architecture (EISA) bus, or the like. The communication line 1240 may be classified into an address bus, a data bus, a control bus, and the like. For ease of representation, only one bold line indicates the bus in FIG. 12, but this does not mean that there is only one bus or only one type of bus.

This application further provides a communication system, configured to perform the method provided in any one of the foregoing procedures, for example, perform any one of the procedures in FIG. 5 to FIG. 10. The communication system may include the architecture shown in FIG. 5.

This application further provides a computer-readable storage medium, configured to store a computer program. The computer program includes instructions used to perform the method provided in any one of the foregoing procedures.

This application further provides a computer program product. The computer program product includes computer program code. When the computer program code is run on a computer, the computer is enabled to perform the method provided in any one of the foregoing procedures.

This application further provides a chip, including a processor. The processor is coupled to a memory, and is configured to execute a computer program or instructions stored in the memory. When the processor executes the computer program or the instructions, the method provided in any one of the foregoing procedures is implemented.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to this application without departing from the protection scope of this application. This application is intended to cover these modifications and variations of this application provided that they fall within the scope of protection defined by the following claims and their equivalent technologies.

What is claimed is:

1. A method, comprising:
 receiving, by a home network security endpoint, a first request from user equipment, wherein the first request comprises a first identifier of the user equipment;
 sending, by the home network security endpoint, a second request to a first network function,
 wherein the second request comprises a second identifier of the user equipment, and
 wherein the second identifier is determined based on the first identifier, or the second identifier is the same as the first identifier,
 receiving, by the home network security endpoint, a first key from the first network function, wherein the first key is generated based on a cipher key, an integrity key, and a name of a serving network of the user equipment; and
 generating, by the home network security endpoint, a second key based on the first key and an identifier of the home network security endpoint,
 wherein the second key comprises at least one of an encryption protection key or an integrity protection key between the user equipment and the home network security endpoint.

2. The method according to claim 1, wherein the second request is of obtaining user equipment authentication, the second request of the obtaining the user equipment authentication further comprises indication information, and the indication information indicates to generate the first key based on the cipher key, the integrity key, and the name of the serving network of the user equipment.

3. The method according to claim 1, wherein the first request further comprises the name of the serving network of the user equipment, and the second request further comprises the name of the serving network.

4. The method according to claim 1, wherein the first request further comprises an encryption indication, and the encryption indication indicates that the user equipment requests a user-plane encryption service.

5. The method according to claim 1, wherein the first network function comprises an authentication server function or a unified data management function.

6. The method according to claim 5, wherein the first network function is the unified data management function, the method further comprises:
receiving, by the unified data management function, the second request from the home network security endpoint;
generating, by the unified data management function, the cipher key and the integrity key of the user equipment based on the second identifier;
generating, by the unified data management function, the first key based on the cipher key, the integrity key, and the name of the serving network of the user equipment; and
sending, by the unified data management function, the first key to the home network security endpoint.

7. The method according to claim 6, further comprising:
receiving, by the unified data management function, a subscription concealed identifier (SUCI) of the user equipment from the home network security endpoint;
determining, by the unified data management function, a subscription permanent identifier (SUPI) of the user equipment based on the SUCI; and
sending, by the unified data management function, the SUPI of the user equipment to the home network security endpoint.

8. The method according to claim 6, wherein the second request is of obtaining user equipment authentication, the second request of the obtaining the user equipment authentication further comprises indication information, and the generating, by the unified data management function, the first key based on the cipher key, the integrity key, and the name of the serving network of the user equipment comprises:
generating, by the unified data management function, the first key based on the cipher key, the integrity key, and the name of the serving network of the user equipment after the receiving the indication information.

9. The method according to claim 6,
wherein the second request further comprises the name of the serving network of the user equipment;
or
wherein the method further comprises:
determining, by the unified data management function based on the second identifier, a first name of a first serving network with which the user equipment is registered, or a second name of a second serving network which is authenticated by the user equipment, or a third name of a third serving network in which the user equipment is located.

10. A method, comprising:
sending, by user equipment, a first request to a home network security endpoint, wherein the first request comprises a first identifier of the user equipment;
receiving, by the user equipment, a random number from the home network security endpoint;
generating, by the user equipment, a cipher key and an integrity key based on the random number and a root key of the user equipment;
generating, by the user equipment, a first key based on the cipher key, the integrity key, and a name of a serving network of the user equipment; and
generating, by the user equipment, a second key based on the first key and an identifier of the home network security endpoint,
wherein the second key comprises at least one of an encryption protection key or an integrity protection key between the user equipment and the home network security endpoint.

11. The method according to claim 10,
wherein the first request further comprises the name of the serving network of the user equipment; or
wherein the first request further comprises an encryption indication, and the encryption indication indicates that the user equipment requests a user-plane encryption service.

12. An apparatus, comprising:
at least one processor, and
a memory, storing instructions, which when executed by the at least one processor, cause the apparatus to:
receive a first request from user equipment, wherein the first request comprises a first identifier of the user equipment;
send a second request to a first network function,
wherein the second request comprises a second identifier of the user equipment, and
wherein the second identifier is determined based on the first identifier, or the second identifier is the same as the first identifier,
receive a first key from the first network function, wherein the first key is generated based on a cipher key, an integrity key, and a name of a serving network of the user equipment, and wherein the apparatus is or is part of a home network security endpoint; and
generate a second key based on the first key and an identifier of the home network security endpoint,
wherein the second key comprises at least one of an encryption protection key or an integrity protection key between the user equipment and the home network security endpoint.

13. The apparatus according to claim 12, wherein the second request is of obtaining user equipment authentication, the second request of the obtaining the user equipment authentication further comprises indication information, and the indication information indicates to generate the first key based on the cipher key, the integrity key, and the name of the serving network of the user equipment.

14. The apparatus according to claim 12, wherein the first request further comprises the name of the serving network of the user equipment, and the second request further comprises the name of the serving network.

15. The apparatus according to claim 12, wherein the first network function comprises an authentication server function or a unified data management function.

16. The apparatus according to claim 12, wherein the first request further comprises an encryption indication, and the encryption indication indicates that the user equipment requests a user-plane encryption service.

17. The apparatus according to claim 12, wherein the cipher key and the integrity key of the user equipment are based on the second identifier.

18. An apparatus, comprising:
at least one processor, and
a memory, storing instructions, which when executed by the at least one processor, cause the apparatus to:
send a first request to a home network security endpoint, wherein the first request comprises a first identifier of user equipment, and wherein the apparatus is or is part of the user equipment;
receive a random number from the home network security endpoint;
generate a cipher key and an integrity key based on the random number and a root key of the user equipment;
generate a first key based on the cipher key, the integrity key, and a name of a serving network of the user equipment; and
generate a second key based on the first key and an identifier of the home network security endpoint, wherein
the second key comprises at least one of an encryption protection key or an integrity protection key between the user equipment and the home network security endpoint.

19. The apparatus according to claim 18,
wherein the first request further comprises the name of the serving network of the user equipment; or
wherein the first request further comprises an encryption indication, and the encryption indication indicates that the user equipment requests a user-plane encryption service.

* * * * *

UNITED STATES PATENT AND TRADEMARK OFFICE
CERTIFICATE OF CORRECTION

PATENT NO. : 12,413,963 B2  
APPLICATION NO. : 18/505391  
DATED : September 9, 2025  
INVENTOR(S) : Fei Li Page 1 of 1

It is certified that error appears in the above-identified patent and that said Letters Patent is hereby corrected as shown below:

In the Claims

In Column 26, in Claim 1, Line 51, delete "identifier," and insert -- identifier; --.

In Column 28, in Claim 12, Line 24, delete "processor," and insert -- processor; --.

In Column 28, in Claim 12, Line 35, delete "identifier," and insert -- identifier; --.

In Column 29, in Claim 18, Line 2, delete "processor," and insert -- processor; --.

Signed and Sealed this  
Fourteenth Day of October, 2025

John A. Squires  
*Director of the United States Patent and Trademark Office*